United States Patent
Liao

(10) Patent No.: US 9,252,890 B2
(45) Date of Patent: Feb. 2, 2016

(54) NEAR FIELD COMMUNICATION DEVICE AND METHOD FOR SAVING APPLIED POWER

(71) Applicant: HON HAI PRECISION INDUSTRY CO., LTD., New Taipei (TW)

(72) Inventor: Kuang-Yao Liao, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 136 days.

(21) Appl. No.: 14/066,705

(22) Filed: Oct. 30, 2013

(65) Prior Publication Data

US 2014/0170975 A1 Jun. 19, 2014

(30) Foreign Application Priority Data

Dec. 17, 2012 (TW) .............................. 101147815 A

(51) Int. Cl.
*H04B 5/00* (2006.01)
*H04B 15/00* (2006.01)

(52) U.S. Cl.
CPC . *H04B 15/00* (2013.01); *H04B 5/00* (2013.01)

(58) Field of Classification Search
CPC .......... G06K 19/0723; G06K 7/10297; H04W 4/008
USPC .............. 455/41.1, 41.2, 39, 41.3; 340/686.6, 340/539.23, 13.26
See application file for complete search history.

(56) References Cited

U.S. PATENT DOCUMENTS

| | | | |
|---|---|---|---|
| 8,111,144 B2 * | 2/2012 | Kirkup et al. ............... | 340/13.26 |
| 8,463,186 B2 * | 6/2013 | Griffin et al. ................ | 455/41.2 |
| 8,665,105 B2 * | 3/2014 | Kirkup et al. ............... | 340/686.6 |
| 8,744,357 B2 * | 6/2014 | Zhu et al. ..................... | 455/41.2 |
| 8,934,837 B2 * | 1/2015 | Zhu et al. ..................... | 455/41.1 |
| 9,020,428 B2 * | 4/2015 | Meunier et al. .............. | 455/41.1 |

* cited by examiner

*Primary Examiner* — Sonny Trinh
(74) *Attorney, Agent, or Firm* — Novak Druce Connolly Bove + Quigg LLP

(57) ABSTRACT

An NFC device and an applied method for power saving is provided. The NFC device includes a display unit, an NFC module, a proximity sensor and a control unit. In an initial state, the NFC module is on an idle mode, and the display unit is on an active mode. The proximity sensor is arranged adjacent to the NFC module, and detects whether an external NFC terminal comes close to the NFC device. If the proximity sensor determines that the external NFC terminal comes close to the NFC device, and the proximity sensor generates and sends a first interrupt signal to the control unit. The control unit enables the NFC module and disables the display unit, in response to the first interrupt signal, resulting in reduced power consumption of the display unit and reduced EMI interference generated between the display unit and the NFC module.

19 Claims, 2 Drawing Sheets

NEAR FIELD COMMUNICATION DEVICE AND METHOD FOR SAVING APPLIED POWER

BACKGROUND

1. Technical Field

The present disclosure relates to a near field communication (NFC) device and a method for power saving applied in the NFC device.

2. Description of Related Art

NFC technology is used in many popular applications. NFC devices can integrate with several different applications, such as bus card, credit card, access card, bank card and membership card, which brings a great convenience to daily life. However, when the existing NFC devices is in use, the NFC module of the NFC devices is always in active mode, which will consume a lot of electrical power. In addition, during the process of an NFC function of the NFC device, a display unit, a backlight module, and a touch panel of the NFC device are also in use, which will produce Electro-Magnetic Interference (EMI), which will effect the performance of the NFC module.

Therefore, there is room for improvement within the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
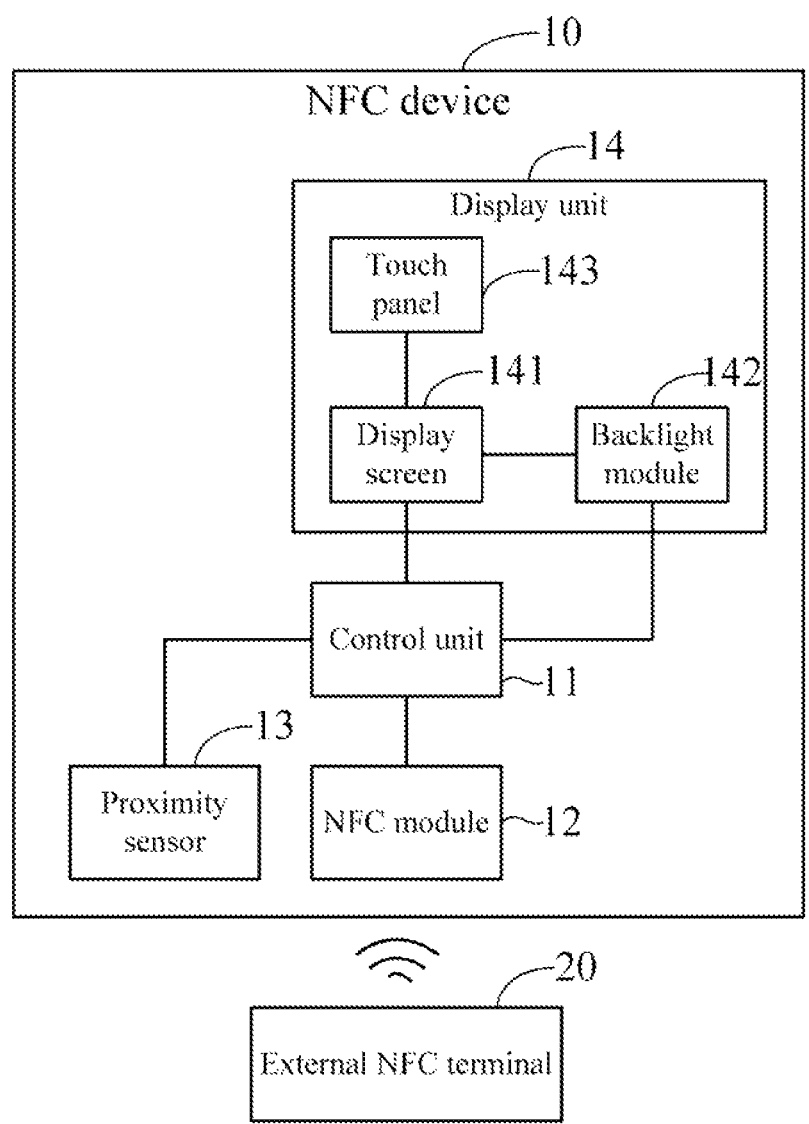
FIG. 1(a) is a block diagram of an NFC device, according to an embodiment.

FIG. 1 shows an NFC device 10 of the embodiment. The NFC device 10 includes a control unit 11, an NFC module 12, a proximity sensor 13, and a display unit 14. In this embodiment, the NFC device 10 is an electronic wrist watch, and is configured to show time and to communicate with an external NFC terminal 20 to exchange data to complete a given function, such as a payment function. In other embodiments, the NFC device 10 may be selected from a group consisting of a mobile phone and a tablet computer. The external NFC terminal 20 may be an NFC card, for example.

The proximity sensor 13 is arranged adjacent to the NFC module 12. The proximity sensor 13 is configured to detect whether the external NFC terminal 20 comes close to the NFC device 10. When the proximity sensor 13 detects that the external NFC terminal 20 appears and a distance between the external NFC terminal 20 and the NFC device 10 is less than a predetermined threshold value, the proximity sensor 13 determines that the external NFC terminal 20 comes close to the NFC device 10, and the proximity sensor 13 generates and sends a first interrupt signal to the control unit 11. The control unit 11 enables the NFC module 12 and disables the display unit 14 simultaneously, in response to the first interrupt signal, resulting in reduced power consumption of the display unit 14 and reduced EMI interference generated between the display unit 14 and the NFC module 12. In this embodiment, the threshold value can be preset according to an emitting efficiency and a receiving sensitivity of the NFC module 12. The display unit 14 may include a display screen 141, a backlight module 142, and a touch panel 143.

When the NFC module 12 is enabled, the NFC module 12 is set to be on a read/write mode, the NFC module 12 is thus able to communicate with the external NFC terminal 20 to perform a corresponding NFC function. When the display unit 14 is disabled, the display unit 14 is set to be on an idle mode.

When the proximity sensor 13 detects that no external NFC terminal 20 is close to the NFC device 10 or a distance between the external NFC terminal 20 and the NFC device 10 is greater than the threshold value, the proximity sensor 13 generates and sends a second interrupt signal to the control unit 11. The control unit 11 disables the NFC module 12 and turns on the display unit 14 simultaneously, in response to the second interrupt signal, resulting in reduced power consumption of the NFC module 12.

When the NFC module 12 is disabled, the NFC module 12 is set to be on an idle mode, on which the NFC module 12 is not able to communicate with the external NFC terminal 20 thereby consumes reduced power. When the display unit 14 is enabled, the display unit 14 is set to be on an active mode.

Figure 2:
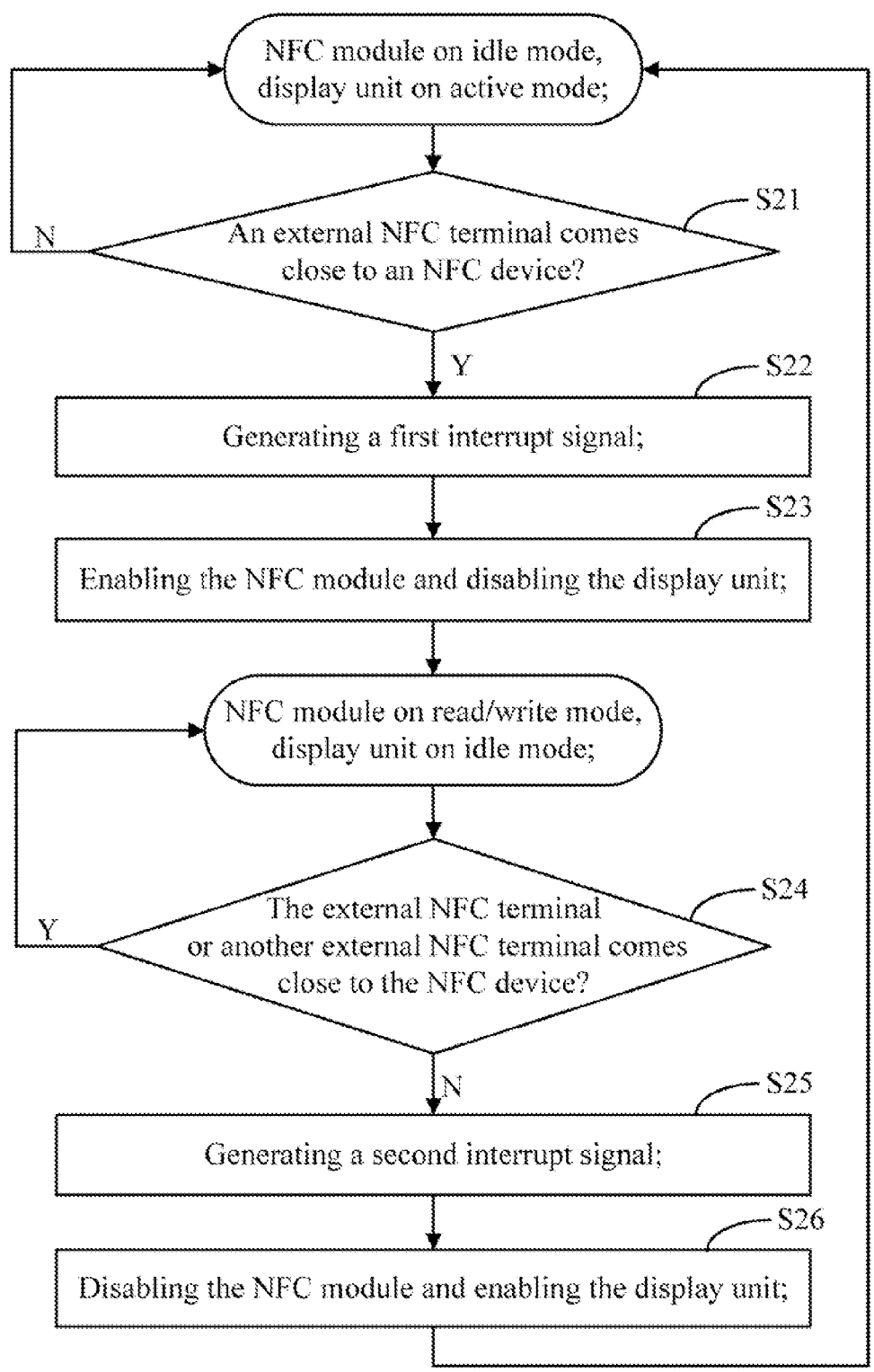
FIG. 2 is flowchart illustrating a method for power saving applied in the NFC device of FIG. 1.

FIG. 2 shows a flowchart illustrates a method for power saving. In this embodiment, in an initial state, the NFC module 12 is on the idle mode, and the display unit 14 is on an active mode.

In step S21, the proximity sensor 13 detects whether the external NFC terminal 20 comes close to the NFC device 10. If the proximity sensor 13 determines that the external NFC terminal 20 comes close to the NFC device 10, the procedure goes to step S22; otherwise the procedure returns to step S20.

In this embodiment, when the proximity sensor 13 detects that the external NFC terminal 20 appears and a distance between the external NFC terminal 20 and the NFC device 10 is less than the threshold value, the proximity sensor 13 determines that the external NFC terminal 20 comes close to the NFC device 10.

In step S22, the proximity sensor 13 generates and sends the first interrupt signal to the control unit 11.

In step S23, the control unit 11 enables the NFC module 12 and disables the display unit 14 simultaneously, in response to the first interrupt signal, resulting in reduced power consumption of the display unit 14 and reduced EMI interference generated between the display unit 14 and the NFC module 12.

When the NFC module 12 is enabled, the NFC module 12 is set to be on a read/write mode, and is able to communicate with the external NFC terminal 20 to perform a corresponding NFC function. When the display unit 14 is disabled, the display unit 14 is set to be on an idle mode.

In step S24, the proximity sensor 13 detects whether the external NFC terminal 20 or another external NFC terminal comes close to the NFC device 10.

In step S25, if the proximity sensor 13 determines that no external NFC terminal is close to the NFC device 10, the proximity sensor 13 generates and sends the second interrupt signal to the control unit 11.

In step S26, the control unit 11 disables the NFC module 12 and enables the display unit 14 simultaneously, in response to the second interrupt signal, resulting in reduced power consumption of the NFC module 12.

When the NFC module 12 is disabled and the display unit 14 is enabled, the NFC module 12 is set to be on an idle mode, and the display unit 14 is set to be on an active mode, and the procedure returns to the initial state.

Moreover, it is to be understood that the disclosure may be embodied in other forms without departing from the spirit thereof. Thus, the present examples and embodiments are to be considered in all respects as illustrative and not restrictive, and the disclosure is not to be limited to the details given herein.

What is claimed is:

1. A near field communication (NFC) device comprising:
   a display unit and an NFC module, wherein in an initial state, the NFC module is on an idle mode, and the display unit is on an active mode;
   a proximity sensor arranged adjacent to the NFC module, and the proximity sensor configured to detect whether an external NFC terminal comes close to the NFC device; wherein if the proximity sensor determines that the external NFC terminal comes close to the NFC device, and the proximity sensor generates and sends a first interrupt signal to a control unit; and
   the control unit configured to enable the NFC module and disable the display unit, in response to the first interrupt signal.

2. The NFC device as described in claim 1, wherein when the NFC module is enabled, the NFC module is set to be on a read/write mode, and is able to communicate with the external NFC terminal to exchange data to complete a given function.

3. The NFC device as described in claim 1, wherein when the proximity sensor detects that the external NFC terminal appears and a distance between the external NFC terminal and the NFC device is less than a predetermined threshold value, the proximity sensor determines that the external NFC terminal comes close to the NFC device.

4. The NFC device as described in claim 3, wherein if the proximity sensor detects that no external NFC terminal is close to the NFC device or a distance between the external NFC terminal and the NFC device is greater than the threshold value, the proximity sensor generates and sends a second interrupt signal to the control unit; and the control unit disables the NFC module and enables the display unit, in response to the second interrupt signal.

5. The NFC device as described in claim 4, wherein when the NFC module is disabled, the NFC module is set to be on an idle mode, on which the NFC module is not able to communicate with the external NFC terminal thereby consumes reduced power.

6. The NFC device as described in claim 4, wherein the threshold value is preset according to an emitting efficiency and a receiving sensitivity of the NFC module.

7. A method for power saving applied in an NFC device, the NFC device comprising a display unit, an NFC module, a proximity sensor and a control unit, wherein in an initial state, the NFC module is on an idle mode, and the display unit is on an active mode, the method comprising:
   detecting whether an external NFC terminal comes close to the NFC device using the proximity sensor;
   if the proximity sensor determines that the external NFC terminal comes close to the NFC device, generating and sending a first interrupt signal to the control unit using the proximity sensor; and
   enabling the NFC module and disabling the display unit, in response to the first interrupt signal, using the control unit.

8. The method as described in claim 7, wherein when the NFC module is enabled, the NFC module is set to be on a read/write mode, and is able to communicate with the external NFC terminal to exchange data to complete a given function.

9. The method as described in claim 7, wherein when the proximity sensor detects that the external NFC terminal appears and a distance between the external NFC terminal and the NFC device is less than a predetermined threshold value, the proximity sensor determines that the external NFC terminal comes close to the NFC device.

10. The method as described in claim 9, further comprising:
    detecting whether the external NFC terminal or another external NFC terminal comes close to the NFC device using the proximity sensor;
    if the proximity sensor determines that no external NFC terminal is close to the NFC device, generating and sending a second interrupt signal to the control unit using the proximity sensor;
    disabling the NFC module and enabling the display unit, in response to the second interrupt signal, using the control unit.

11. The method as described in claim 9, wherein the threshold value is preset according to an emitting efficiency and a receiving sensitivity of the NFC module.

12. A near field communication (NFC) device comprising:
    a display unit and an NFC module, wherein in an initial state, the NFC module is on an idle mode, and the display unit is on an active mode;
    a proximity sensor arranged adjacent to the NFC module, and the proximity sensor configured to detect whether an external NFC terminal comes close to the NFC device; wherein if the proximity sensor detects that the external NFC terminal appears and a distance between the external NFC terminal and the NFC device is less than a predetermined threshold value, the proximity sensor determines that the external NFC terminal comes close to the NFC device, and the proximity sensor generates and sends a first interrupt signal to a control unit; if the proximity sensor detects that no external NFC terminal is close to the NFC device or a distance between the external NFC terminal and the NFC device is greater than the threshold value, the proximity sensor generates and sends a second interrupt signal to the control unit; and
    the control unit configured to enable the NFC module and disable the display unit in response to the first interrupt signal, or disable the NFC module and enable the display unit in response to the second interrupt signal.

13. The NFC device as described in claim 12, wherein when the NFC module is enabled, the NFC module is set to be on a read/write mode, and is able to communicate with the external NFC terminal to exchange data to complete a given function.

14. The NFC device as described in claim 12, wherein when the NFC module is disabled, the NFC module is set to be on an idle mode, on which the NFC module is not able to communicate with the external NFC terminal, and thereby consumes reduced power.

15. The NFC device as described in claim 12, wherein the threshold value is preset according to an emitting efficiency and a receiving sensitivity of the NFC module.

16. A method for power saving applied in a near field communication (NFC) device, the NFC device comprising a display unit, an NFC module, a proximity sensor and a control unit, wherein in an initial state, the NFC module is on an idle mode, and the display unit is on an active mode, the method comprising:
    detecting whether an external NFC terminal comes close to the NFC device using the proximity sensor;

upon detecting that the external NFC terminal appears and a distance between the external NFC terminal and the NFC device is less than a predetermined threshold value, determining that the external NFC terminal comes close to the NFC device, generating and sending a first interrupt signal to the control unit using the proximity sensor, and enabling the NFC module and disabling the display unit in response to the first interrupt signal using the control unit;

or, upon detecting that no external NFC terminal is close to the NFC device or a distance between the external NFC terminal and the NFC device is greater than the threshold value, generating and sending a second interrupt signal to the control unit using the proximity sensor, and disabling the NFC module and enabling the display unit in response to the second interrupt signal using the control unit.

17. The method as described in claim 16, wherein when the NFC module is enabled, the NFC module is set to be on a read/write mode, and is able to communicate with the external NFC terminal to exchange data to complete a given function.

18. The method as described in claim 16, wherein when the NFC module is disabled, the NFC module is set to be on an idle mode, on which the NFC module is not able to communicate with the external NFC terminal and thereby consumes reduced power.

19. The method as described in claim 16, wherein the threshold value is preset according to an emitting efficiency and a receiving sensitivity of the NFC module.

\* \* \* \* \*